United States Patent

[11] 3,607,862

| [72] | Inventors | Gerald Myer Jaffe<br>Verona;<br>William Szkrybalo, Verona; Peter Hans Weinert, Wayne, all of N.J. |
|---|---|---|
| [21] | Appl. No. | 796,578 |
| [22] | Filed | Feb. 4, 1969 |
| [45] | Patented | Sept. 21, 1971 |
| [73] | Assignee | Hoffmann-La Roche Inc.<br>Nutley, N.J. |

[54] PROCESS FOR PREPARING CARBOHYDRATE KETALS
29 Claims, No Drawings

[52] U.S. Cl. .................................................. 260/209 R,
260/210 R
[51] Int. Cl. .................................................. C07c 47/18
[50] Field of Search .......................................... 260/209,
210, 209 R

[56] References Cited
UNITED STATES PATENTS

| 2,715,121 | 8/1955 | Glen et al. ................... | 260/209 |
| 3,096,323 | 7/1963 | Touey et al. .................. | 260/209 |
| 3,277,076 | 10/1966 | Yotsuzuka .................... | 260/209 |
| 3,305,535 | 2/1967 | Merten et al. ................. | 260/209 |
| 3,451,993 | 6/1969 | Goshima et al. ............... | 260/210 |

*Primary Examiner*—Lewis Gotts
*Assistant Examiner*—Johnnie R. Brown
*Attorneys*—Samuel L. Welt, Jon S. Saxe, Bernard S. Leon, William H. Epstein and George M. Gould

ABSTRACT: Preparation of ketal sugars from sugars utilizing perchloric acid as a catalyst.

3,607,862

PROCESS FOR PREPARING CARBOHYDRATE KETALS

BACKGROUND OF THE INVENTION

In the past, ketal sugars have been prepared by reacting the sugar with a ketone or aldehyde utilizing concentrated sulfuric acid as a catalyst. By this process, the ketal sugars such as 2,3:4,6-diacetone-L-sorbose, an important intermediate in the preparation of ascorbic acid (vitamin C), have been obtained in direct yields of at most 70 percent. In this process, various by-products contaminate the ketal sugar product. Furthermore, these by-products are separated with difficulty from the ketal sugars.

A further disadvantage of utilizing concentrated sulfuric acid in this reaction lies in the fact that large quantities of this acid must be utilized in order to produce the ketal sugar. The excess quantities of sulfuric acid in this reaction medium must then be neutralized with a suitable alkali in order that the resulting ketal be recovered. In the case of 2,3:4,6-diketal sorbose, any unneutralized acid will interfere in the subsequent conversion of this diketal to ascorbic acid. Furthermore, the neutralization step is both expensive and time-consuming, additionally creating a problem as to the disposal of large quantities of the salt produced by this neutralization.

SUMMARY OF THE INVENTION

In accordance with this invention, it has been found that when a sugar of the formula:

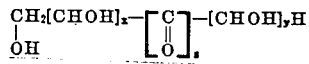   I wherein $x$ is an integer from 1 to 5 and $y$ and $z$ are integers from 0 to 1 is reacted with a ketone or aldehyde of the formula:

   II wherein $R_1$ and $R_2$ are selected from the group consisting of hydrogen, lower alkyl, aralkyl and aryl and taken together form a lower alkylene radical in the presence of small or catalytic quantities of perchloric acid, an equilibrium can be set up between the sugar of formula I and the ketone or aldehyde of formula II. This equilibrium can be displaced by conventional water removal procedures to give direct yields as high as 92 to 94 percent of the desired ketal sugar. In the case of conventional sulfuric acid processes, such displacement of the equilibrium to give high direct yields is not possible. The present process also eliminates the problem of neutralization and the problem of having to dispose of large quantities of inorganic salts.

In accordance with a preferred embodiment of this invention, the compound of formula I is reacted with the ketone or aldehyde of the formula II under reflux conditions in a substantially water immiscible liquid organic solvent medium wherein said solvent has a boiling point below 55° C., preferably from about 30° to 50° C. By means of the water immiscible liquid organic solvent, this reaction proceeds in such a manner that the water can be removed from the reaction zone by distillation at a rate comparable to its formation. This allows no substantial buildup of water in the reaction zone. In this manner, water can be removed from the reaction zone quickly and easily without the necessity of utilizing large amounts of solvent as has been the procedure in the past. Hence by means of this process, the solvent need only be utilized in an amount of, at most 20 times the weight of the sugar of formula I above.

DETAILED DESCRIPTION

The reaction of this invention is ideally suited to the production of a 2,3:4,6-diketal sorbose such as 2,3:4,6-diacetone sorbose. This reaction can be illustrated in the following manner:

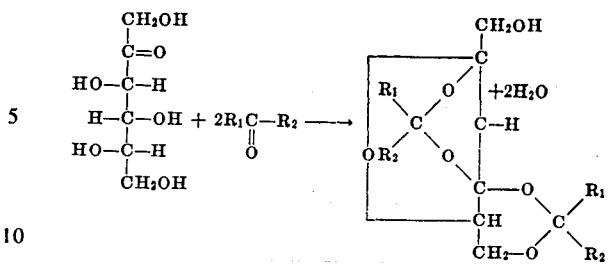

wherein $R_1$ and $R_2$ are as above.

In accordance with an embodiment of this invention when $z$ in the compound of formula I above is equal to 0, then the compound of formula I is a sugar of the formula:

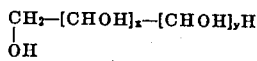   I-A wherein $x$ and $y$ are as above. When the compound of formula I—A is reacted with the compound of formula II in accordance with the process of this invention a ketal is produced in high yields by utilizing only small or catalytic quantities of perchloric acid.

In accordance with another embodiment of this invention, when $z$ in formula I above is 1 then the compound of formula I above is a sugar. In this case, the compound of formula I above has the following formula:

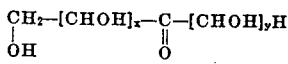   I-B wherein $x$ and $y$ are as above. When the compound of formula I—B is reacted with the compound of formula II in accordance with this invention a ketal is produced in high yields utilizing only small or catalytic quantities of perchloric acid.

Among the sugars of formula I above which can be utilized in accordance with this invention are included ribose, fructose, glucose, arabinose, xylose, xylitol, mannose, erythrose, heptose, mannitol, pentitol, sorbitol and hexitol.

As used herein, the term "lower alkyl" denotes straight and branched chain hydrocarbons having from 1 to 7 carbon atoms such as methyl, ethyl, propyl, isopropyl, butyl, t-butyl, and the like. The term "aralkyl" denotes phenyl lower alkyl radicals such as benzyl, phenethyl, phenpropyl, etc. The term "aryl" denotes phenyl and phenyl substituted with a lower alkoxy or lower alkyl group. The substituted phenyl groups include methoxyphenyl, polymethoxyphenyl, ethoxyphenyl, polyethoxyphenyl, etc. The term "lower alkoxy" denotes lower alkoxy groups containing from 1 to 7 carbon atoms such as methoxy, ethoxy, propoxy, etc. The term "lower alkylene" includes both straight and branched chain alkylene radicals containing from 2 to 7 carbon atoms such as ethylene, propylene, butylene, etc.

In carrying out the reaction of this invention, at least one mole of the compound of formula II above is present per mole of the compound of formula I above. If desired, a large excess, such as 6 moles of the compound of formula II above per mole of the compound of formula I above, can be present in the reaction medium. If it is desired to produce a diketal of the compound of formula I, then 2 moles of the compound of formula II are reacted per mole of the compound of formula I.

In forming the ketal, in accordance with this invention, any compound of the formula II above can be utilized Among the preferred aldehydes or ketones of the formula II above, which can be utilized in accordance with this invention, are included, methyl-ethyl-ketone, formaldehyde, acetaldehyde, benzylaldehyde, dibenzyl ketone, diphenylethyl ketone, cycloheptanone, cyclohexanone, etc. The preferred compound of formula II above is acetone, The reaction of this invention is carried out in the presence of perchloric acid. Generally, it is preferred to utilize catalytic quantities of perchloric acid. Therefore, in accordance with a preferred embodiment of this invention, the perchloric acid can be utilized in an amount of from about 0.1 percent by weight to about 10 percent by weight, based upon the weight of sugar of formula I utilized as the starting material. If desired, large quantities of perchloric acid, i.e., amounts greater than 20 percent by weight, based upon the weight of the sugar of formula I, can be utilized in carrying out this reaction. However, it is seldom desired to utilize such large quantities of perchloric acid since no additional beneficial results are achieved thereby.

The process of this invention can be carried out using the aldehyde or ketone of formula II as a solvent. However, if desired, a conventional inert organic solvent can be used. Any conventional inert organic solvent can be present in the reaction; for example, benzene, toluene, hexane, and the like.

In carrying out the process, the conditions of temperature and pressure should be adjusted so as to remove the water formed during the reaction; for example, temperatures of from about 0° C. to about 100° C. can be used provided that the pressure is adjusted so that water formed during the reaction can be removed from the reaction medium. Generally, it is preferred to use a temperature of from about 20° C. to 40° C. and a vacuum of from 25 mm. Hg to 400 mm. Hg However, atmospheric pressure coupled with reflux temperature of the reaction medium can also be used.

In carrying out the process of this invention, at least 1 mole of the ketone or aldehyde of formula II can be reacted with 1 mole of the sugar starting material of formula I. If it is desired to produce a diketal, 2 mols of the aldehyde or ketone of formula II are reacted with 1 mole of the compound of formula I. An excess of the aldehyde or ketone of formula II can be present in the reaction medium. Furthermore, the conditions of the reaction, such as time and reaction temperature, can be adjusted to allow for the formation of either monoketal, diketal, triketal and the like. The conditions with regard to time and temperature for forming the desired monoketal or polyketal are conventional in the art and, to a large extent, depend upon the reactive hydroxy or carbonyl groups contained within the sugar starting material of formula I.

Any conventional method of removing the water formed during the reaction can be used. One of these methods is to employ molecular sieves in the reaction medium. These sieves are capable of adsorbing the water formed during the reaction. Another means of carrying out this reaction is by distilling the water/acetone mixture formed during this reaction and passing the condensed distillate through molecular sieves to remove water from the distillate. The distillate, with the water removed, can be then recycled back into the reaction mixture.

In accordance with a preferred embodiment of this invention, a water immiscible liquid organic solvent having a boiling point of at most 55° C. is utilized as the solvent medium to provide effective removal of the water from the reaction medium.

Any conventional water immiscible liquid inert organic solvent having a boiling point of at most 55° C. can be utilized. Generally, it is preferred to utilize an inert organic water immiscible solvent having a boiling point of from 30° C. to 50° C. In accordance with this invention, the solvent that is utilized should be substantially water immiscible. Among the solvents which can be utilized in accordance with this invention are included pentane, ethyl bromide, methylene chloride, 1,2-dichloroethylene, 2-chloropropane, 1-chloropropane, isoprene, etc. The beneficial results of this invention can be obtained by utilizing these solvents in an amount of at least 5 ml. of solvent per gram of the sugar of formula I. If desired, the solvent can be utilized in amounts of greater than 100 ml. of solvent per gram of sorbose. While any amount of solvent can be utilized in carrying out this reaction, it is generally preferred to avoid the use of excess solvents, since the use of excess solvents requires larger equipment and more heat for distillation. Generally, it is preferred to utilize the inert organic water immiscible solvent in an amount of from about 5 ml. to 100 ml. per gram of the sugar of formula I above.

In carrying out the reaction of this invention, the solvent and water entrained therein are removed from the reaction medium by distillation. Any conventional means of distillation can be utilized to carry out this reaction in accordance with this invention. The distillate from the reaction mixture is condensed to form a water layer and a solvent layer. The solvent layer can, if desired, be recycled back into the reaction medium after the water layer is separated therefrom. Any conventional means of separating the water layer from the solvent layer can be utilized.

In carrying out this reaction, any suitable conditions for refluxing the reaction medium can be utilized. Generally, the reaction is carried out at the reflux temperature of the reaction mixture. Atmospheric pressure can be utilized. However, lower temperatures also can be utilized with a suitable vacuum to reflux the reaction mixture.

The term ketal as used herein is defined to include any dialkoxy alkane containing compound wherein both alkoxy groups are attached to the same carbon atom of the alkane moiety. The term ketal includes acetals.

The following examples are illustrative but not limitative of this invention.

EXAMPLE 1

This example is directed to producing 2,3:4,6-diacetone-1-sorbose by means of the process of this invention.

Ten g. of L-sorbose, 0.25 ml. of aqueous solution containing 71 percent of perchloric acid and 200 ml. of acetone were placed in a 1 liter flask equipped with a stirrer, thermometer, a vapor tube, condenser, and a liquid receiver for receiving the distillate from the condenser.

In this reaction the sorbose, acetone and perchloric acid were heated to 35° C. (distillation temperature) under about 200 mm.HG pressure for 4 hours. During this period, the acetone and water formed during the reaction were distilled from the flask into the receiver. The rate of distillation was maintained during the reaction at a velocity corresponding to 4 times the volume of the initial reaction mixture per hour. During this period, acetone was continually fed into the reaction medium to constantly maintain the volume in the reaction flask at 200 ml.

After the reaction, the 2,3:4,6-diacetone-L-sorbose was recovered by the following procedure:

The solution remaining in the flask was neutralized to a pH of about 8 by the addition of an aqueous sodium carbonate solution. After neutralization, the excess solvent was removed from the solution by distillation.

The residue remaining in the flask was dissolved in toluene and extracted with 3 portions of 0.05 M sodium hydroxide. The aqueous solutions were combined and extracted with 5 portions of toluene. The toluene extract was evaporated to give 12.3 grams of 2,3:4,6-diacetone-L-sorbose (85 percent yield).

EXAMPLE 2

Twenty Grams of L-sorbose, 0.5 ml. of an aqueous solution containing 71 percent by weight of perchloric acid, 200 ml. of acetone and 200 ml. of pentane were placed in a 1 liter flask equipped with a stirrer, thermometer, a vapor tube, condenser and liquid receiver for receiving the distillate from the condenser. The mixture was stirred and refluxed at 35° C. for 9 hours. During this period, the solvent, acetone and water formed in the reaction were distilled from the flask, condensed and collected in the receiver. In the receiver, two layers formed; a lower aqueous layer and a solvent layer. The lower aqueous layer was continually removed and the upper layer was continually recycled into the reaction flask. After 9 hours, the reaction was stopped and the residue remaining in the flask was cooled to 10° C. To the cooled residue there was added 2.5 ml. of 4N-sodium hydroxide to adjust the pH of the residue to about 9. This residue was filtered to remove any solids. After the solids were removed, the residue was washed with 50 ml. of acetone. After washing, the residue was concentrated at a temperature of about 40° C. to 50° C. under a vacuum of 50 mm. Hg. to produce crude 2,3:4,6-diacetone-L- sorbose. This crude product was dissolved in 50 ml. of toluene and extracted with five 10 ml. portions of 0.05 N-sodium hydroxide. The aqueous phase which resulted from the washings was separated from the organic layer and was re-extracted with five 50 ml. portions of toluene. The toluene extracts were collected and combined. The combined toluene extracts were concentrated at a temperature of 40° C. to 50° C. under a vacuum of 5 mm. Hg. to produce 24.6 grams of pure 2,3:4,6diacetone-L-sorbose. This represented a yield of 85 percent, based upon L-sorbose.

EXAMPLE 3

The procedure of example 2 was followed except that the solvents listed below were substituted for pentane and the mixture was refluxed at the temperature given below. The same yield of 2,3:4,6diacetone-L-sorbose was obtained as in example 2.

TABLE

| Solvent | Reflux Temperature |
| --- | --- |
| Ethyl bromide | 37° C. |
| Methylene chloride | 38.1° C. |
| 1,2-Dichloroethylene | 45.3° C. |
| 2-Chloropropane | 33.6° C. |
| 1-Chloropropane | 43.4° C. |

EXAMPLE 4

This example is directed to producing 1,2:3,4:5,6-triacetone-D-sorbitol.

One mole (18.2 g.) of D-sorbitol, 0.5 ml. of an aqueous solution containing 70 percent by weight of perchloric acid, Two hundred ml. of acetone and 200 ml. of pentane were placed in a 1 liter flask equipped with a stirrer, thermometer, a vapor tube, condenser and liquid receiver for receiving the distillate from the condenser. The mixture was stirred and refluxed at 35° C. for 4 hours under atmospheric pressure. During this period, the solvent, acetone and water formed in the reaction were distilled from the flask, condensed and collected in the receiver. In the receiver, two layers formed; a lower aqueous layer and a solvent layer. The lower aqueous layer was continually removed and the upper layer was continually recycled into the reaction flask. After the reaction was stopped the residue remaining in the flask was cooled to 10° C. To the cooled residue there was added 5.5 ml. of 4N-sodium hydroxide to adjust the pH of the residue to about 9. The residue was filtered to remove any solids. After the solids were removed, the residue was washed with 50 ml. of acetone. After washing, the residue was concentrated at a temperature of about 40° C. to 50° C. under a vacuum of 50 mm. Hg. to produce crude 1,2:3,4:5,6-triacetone-D-sorbitol. The crude product was distilled at 80°–90° C. and pressure less than 1 mm. and gave 29.0 grams of purified material which analyzed by glpc to be >98 percent pure (96 percent yield).

EXAMPLE 5

This procedure is directed to the preparation of 1,2:5,6-diacetone- D-glucofuranose.

Twenty grams of anhydrous α-D-glucose, 0.5 ml. of an aqueous solution containing 70 percent by weight of perchloric acid, 200 ml. of acetone and 200 ml. of pentane were placed in a 1 liter flask equipped with a stirrer, thermometer, a vapor tube, condenser and liquid receiver for receiving the distillate from the condenser. The mixture was stirred and refluxed at 35° C. for 24 hours under atmospheric pressure. During this period, the solvent, acetone and water formed in the reaction were distilled from the flask, condensed and collected in the receiver. In the receiver, two layers formed; a lower aqueous layer and a solvent layer. The lower aqueous layer was continually removed and the upper layer was continually recycled into the reaction flask. After 24 hours, the reaction was stopped and the residue remaining in the flask was cooled to 10° C. To the cooled residue there was added 5.5 ml. of 4N-sodium hydroxide to adjust the pH of the residue to about 9. The residue was filtered to remove any solids. After the solids were removed, the residue was washed with 50 ml. of acetone. After washing, the residue was concentrated at a temperature of about 40° C. to 50° C. under a vacuum of 50 mm. Hg. to produce crude 1,2:5,6-diacetone-D-glucofuranose, a yellow solid weighing 22.1 g. Analysis of the crude product by glpc showed 1,2:5,6-diacetone-D-glucofuranose present in 85 percent. The remaining material consisted of the known two monoacetone derivatives of glucose and a small amount of unreacted glucose. The yield of the desired product was therefore 17.9 g. or 69 percent of theory.

We claim:

1. A process for producing a diketal comprising reacting sorbose with a compound of the formula

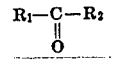

wherein $R_1$ and $R_2$ are selected from the group consisting of hydrogen, lower alkyl, aralkyl and aryl and taken together form a lower alkylene radical in the presence of perchloric acid while continuously removing water from the reaction medium during said reaction.

2. The process of claim 1 wherein the reaction is carried out in a liquid water-immiscible organic solvent having a boiling point of less than 55° C. and said water is removed during the reaction from the reaction medium by distillation as a mixture with said inert solvent.

3. The process of claim 2 wherein said solvent has a boiling point of from about 30° C. to about 50° C.

4. The process of claim 3 wherein said solvent is pentane.

5. A process for producing 2,3:4,6-diacetone-L-sorbose comprising reacting L-sorbose with acetone in the presence of perchloric acid while continuously removing water from said reaction medium during said reaction.

6. The process of claim 5 wherein said perchloric acid is present in an amount of from about 0.1 percent to 10 percent by weight, based upon the weight of said sorbose.

7. The process of claim 5 wherein the reaction is carried out in a liquid water-immiscible organic solvent having a boiling point of less than 55° C. and said water is removed during the reaction from the reaction medium by distillation as a mixture with said inert solvent.

8. The process of claim 7 wherein said solvent has a boiling point of from about 30° C. to about 50° C.

9. The process of claim 8 wherein said solvent is pentane.

10. A process of preparing a ketal sugar comprising reacting a sugar of the formula:

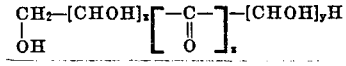

wherein $x$ is an integer from 1 to 5 and $y$ and $z$ are integers from 0 to 1; in the presence of perchloric acid while continuously removing water from the reaction medium during said reaction.

11. The process of claim 10 wherein the reaction is carried out in a liquid water-immiscible organic solvent having a boiling point of less than 55° C. and said water is removed during the reaction from the reaction medium by distillation as a mixture with said inert solvent.

12. The process of claim 11 wherein said solvent has a boiling point of from about 30° C. to about 50° C.

13. The process of claim 10 wherein said sugar has the formula:

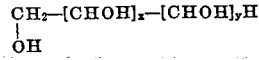

wherein $x$ and $y$ are integers from 0 to 1.

14. The process of claim 13 wherein ferric chloride is present in an amount of from about 0.1 percent to 10 percent by weight, based upon the weight of sugar.

15. The process of claim 13 wherein said water is removed by distillation.

16. The process of claim 13 wherein the reaction is carried out in a liquid water-immiscible organic solvent having a boiling point of less than 55° C. and said water is removed during the reaction from the reaction medium by distillation as a mixture with said inert solvent.

17. The process of claim 16 wherein said solvent has a boiling point of from about 30° C. to about 50° C.

18. A process for producing a diketal comprising
   a. providing a reaction medium composed of a carbonyl compound of the formula:

wherein $R_1$ and $R_2$ are selected from the group consisting of hydrogen, lower alkyl, aralkyl and aryl, and taken together form a lower alkylene radical; sorbose, a liquid, water immiscible, inert, organic solvent having a boiling point below 55° C.;
   b. reacting said medium in the presence of a perchloric acid catalyst while distilling off the water formed by said reaction in the form of a mixture with said solvent;
   c. condensing said distillate to form a condensate having an organic solvent layer and an aqueous layer;
   d. separating said aqueous layer from said organic solvent layer and recycling said organic solvent layer into reaction medium.

19. The process of claim 18 wherein said solvent has a boiling point of from about 30° C. to about 50° C.

20. The process of claim 18 wherein said solvent is pentane.

21. The process of claim 18 wherein said perchloric acid is present in an amount of from about 0.1 percent to 10 percent by weight, based upon the weight of the sorbose.

22. The process of claim 18 wherein said solvent is present in the reaction medium in an amount of from about 5 ml. to 100 ml. per gram of sorbose.

23. A process for producing a ketal compound comprising
   a. providing a reaction medium composed of a carbonyl compound of the formula:

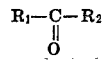

wherein $R_1$ and $R_2$ are selected from the group consisting of hydrogen, lower alkyl, aralkyl and aryl, and taken together form a lower alkylene radical, a sugar of the formula:

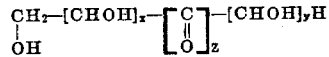

wherein $x$ is an integer from 1 to 5 and $y$ and $z$ are integers from 0 to 1, a liquid, water-immiscible, inert organic solvent having a boiling point below 55° C.;
   b. reacting said medium in the presence of a perchloric acid catalyst while distilling off the water formed by said reaction in the form of a mixture with said solvent;
   c. condensing said distillate to form a condensate having an organic solvent layer and an aqueous layer;
   d. separating said aqueous layer from said organic solvent layer and recycling said organic solvent layer into reaction medium.

24. The process of claim 23 wherein said solvent has a boiling point of from about 30° C. to about 50° C.

25. The process of claim 23 wherein said solvent is pentane.

26. The process of claim 23 wherein said perchloric acid chloride is present in an amount of from about 0.1 percent to 10 percent by weight, based upon the weight of the sugar.

27. The process of claim 23 wherein said solvent is present in the reaction medium in an amount of from about 5 ml. to 100 ml. per gram of the sugar.

28. The process of claim 23 wherein said sugar has the formula:

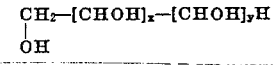

wherein $x$ and $y$ are integers from 0 to 1.

29. The process of claim 23 wherein said sugar has the formula:

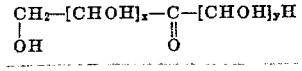

wherein $x$ and $y$ are integers from 0 to 1.

PO-1050
(5/69)

UNITED STATES PATENT OFFICE
CERTIFICATE OF CORRECTION

Patent No. 3,607,862　　　　　Dated September 21, 1971

Inventor(s)　　Jaffe, Szkrybalo and Weinert

It is certified that error appears in the above-identified patent and that said Letters Patent are hereby corrected as shown below:

Column 6, line 75, claim 13

"wherein X and Y are integers from 0 to 1"

should be wherein X and Y are as above

Column 8, line 36, claim 28

"wherein X and Y are integers from 0 to 1"

should be wherein X and Y are as above

Column 8, line 41, claim 29

"wherein X and Y are integers from 0 to 1"

should be wherein X and Y are as above

Signed and sealed this 26th day of December 1972.

(SEAL)
Attest:

EDWARD M. FLETCHER, JR.
Attesting Officer

ROBERT GOTTSCHALK
Commissioner of Patent